United States Patent [19]

Fan et al.

[11] Patent Number: 4,573,760
[45] Date of Patent: Mar. 4, 1986

[54] CONNECTOR SYSTEM FOR A SINGLE OPTICAL FIBER

[76] Inventors: Robert J. Fan, 18951 Kettridge St., Apt. #84, Reseda, Calif. 91355; Teunis Visser, 3412 Orange Grove Ave., Chino, Calif. 91710

[21] Appl. No.: 585,784

[22] Filed: Mar. 2, 1984

Related U.S. Application Data

[63] Continuation-in-part of Ser. No. 340,822, Jan. 19, 1982.

[51] Int. Cl.$^4$ ............................................. G02B 6/38
[52] U.S. Cl. .................................................. 350/96.21
[58] Field of Search ................ 350/96.20, 96.21, 96.15

[56] References Cited

U.S. PATENT DOCUMENTS

| | | |
|---|---|---|
| 4,201,444 | 5/1980 | McCartney et al. |
| 4,208,095 | 7/1980 | Malsot |
| 4,217,029 | 8/1980 | Kao |
| 4,217,031 | 8/1980 | Mignien et al. |
| 4,217,032 | 8/1980 | Sheem |
| 4,253,730 | 3/1981 | Logan et al. |
| 4,291,941 | 9/1981 | Melzer ............................ 350/96.21 |
| 4,427,879 | 1/1984 | Becher et al. .................... 350/96.20 |
| 4,461,539 | 7/1984 | Bailey et al. ..................... 350/96.21 |

*Primary Examiner*—William L. Sikes
*Assistant Examiner*—Robert E. Wise
*Attorney, Agent, or Firm*—Howard A. Kenyon

[57] ABSTRACT

A connector system for coupling a pair of single optical fibers is disclosed. The connector comprises a connector tube, a lens spacer, a pair of positioning sleeves and positioning sleeve elastomeric stoppers, a pair of adjusting screws and a pair of clamping screws with corresponding clamping screw elastomeric stoppers. The optical fibers to be connected are cut and flame treated to form hemispherical beads or lenses on each cut end. The optical fiber lenses are spaced apart inside the connector surrounded by a coupling medium that has an index of refraction higher than the optical fibers. The fibers are optically aligned by fine adjustments such that a maximum strength is obtained.

14 Claims, 6 Drawing Figures

CONNECTOR SYSTEM FOR A SINGLE OPTICAL FIBER

CROSS REFERENCE TO RELATED APPLICATION

This application is a continuation in part of application Ser. No. 340,822 filed Jan. 19, 1982.

BACKGROUND OF THE INVENTION

This invention relates generally to connectors for optical fiber transmission lines comprising only a single mode fiber.

If fiber optic cables are to be used in practical signal transmission and processing systems, practical connectors for the connection and disconnection of fiber optic cables must be provided. The difficulty in achieving connections between single fibers which are sensitive to axial misalignment problems has created an obstacle to the use of long run single data transmission systems.

In the case of a single fiber transmission line, the alignment between the ends of the two fibers requires extreme precision due to the very small dimensions of their respective cross sections. Various factors including the separation distance and axial misalignment affect the light transfer efficiency of a connector.

There are several mechanical methods of connecting optical fibers but all do not readily provide sufficient accuracy for joining and aligning small diameter single mode fibers.

Once such device is U.S. Pat. No. 3,734,594. This connector uses a deformable annular core having pressure plates at both ends. The fiber ends are inserted into the core and a force is applied on the plates to deform the core to align and secure the fibers.

Another device for connecting fibers is U.S. Pat. No. 4,142,777 which consists of three strategically placed cylindrical rods to allow a channel between them for a optical fiber to pass and be aligned.

Still another connector is U.S. Pat. No. 4,057,322 depicting an apparatus for forming reference planes which connect with support structures to assure alignment of the optical fiber.

A major factor of any connecting device is to be an efficient coupling device when it is disconnected and connected during the course of use without substantial losses. What is needed, as described in the present invention, is a device that can be disconnected and connected yet obtain minimum loss by a slight adjustment to axially align the optical fibers, and hence provide minimum losses.

All of the previous connectors also suffer from problems in manufacturing because the inability to provide accurate tolerances yield parts which, in turn, give unsatisfactory connector performance. The device according to the present invention remedies the above mentioned drawbacks and provides improved performance with respect to the prior art.

The novel features which are belived to be characteristics of the invention, both as to its organization and its method of operation, together with further objects and advantages thereof, will be better understood from the following description in connection with the accompanying drawings in which a presently preferred embodiment of the invention is illustrated by way of example. It is expressly understood, however, that the drawings are for purposes of illustration and description only, and are not intended as a definition of the limits of the invention.

SUMMARY OF THE INVENTION

It is the object of this invention to provide a novel connecotr system for a single mode fiber optic.

It is still another object of this invention to provide a novel connector system that can be disconnected and connected without substantial losses.

It is yet another object of this invention to provide a connector system that firmly holds the optic fiber in the connector to prevent pull-out.

Briefly, in accordance with this invention, there is provided a fiber optic connector that aligns two ends of a optical fiber to provide maximum light transmission. This is accomplished by a device that contains two positioning sleeves on each end of the connector tube with a opaque plastic lens spacer therebetween. A laser is used to create an optical channel that is in perfect alignment with the two positioning sleeves. A coupling medium is also placed in the space around the lens spacer to enhance light transmission in the optical channel. The two ends of the optical fiber are flame treated until a hemispherical bead or leans forms on the end. The optical fibers are placed in the position tube and slid toward the optical connector until the optical fiber ends are positioned in the optical channel. The clamping screws are tightened and a signal is transmitted through the fibers. The alignment screws are thereby turned until the maximum signal is obtained. When the maximum signal is obtained, the screws are locked into position.

While the invention will be described in connection with the preferred embodiments, it will be understood that it is not intended to limit the invention to those embodiments. On the contrary, it is intended to cover all alternatives, modifications, and equivalents that may be included within the spirit and scope of the invention as described by the appended claims.

DETAILED DESCRIPTION OF THE PREFERRED EMBODIMENT

Figure 1:
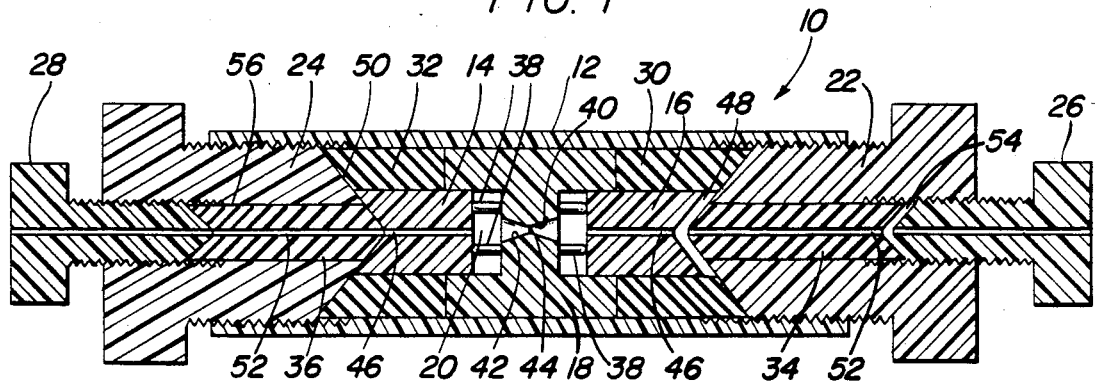
FIG. 1 is a section view of the connector with the elastomers compressed on the left side and uncompressed on the right side.

Referring now to FIG. 1 generally described by 10 there is shown a connector tube 12, a pair of positioning sleeves 14 and 16, a lens spacer 18, a coupling reservoir 20, a pair of alignment screws 22 and 24, a pair of clamping screws 26 and 28, elastomeric stoppers 30 and 32 for securing the positioning sleeves 14 and 16, and elastomeric stoppers 34 and 36 for securing optical fibers (not shown). The lens spacer 18 contains two (2) funnels 40 and 42 and otpical channel 44. The funnels 40 and 42 provide a guide for the ends of the optical fiber to insure that the ends will be placed in the proper position relative to the optical channel 44.

The positioning sleeves 14 and 16 contain a fiber optic channel 46 through which the optical fiber will pass after which it has been prepared for continued transmission. Elastomeric stoppers 30 and 32 will hold the positioning sleeves 14 and 16 in place after the alignment screws 22 and 24 have been tightened. For illustration purposes, alignment screw 22 has not been tightened and therefore the elastomeric stopper 30 has not been compressed. This is evidenced by the small gap 48 between the positioning sleeve 16 and the end of the alignment screw 22. As alignment screw 22 is tightened, gap 48 will disappear and elastomeric stopper 30 will compress. This is shown on the opposite side as the elastomeric stopper 32 has been compressed by alignment screw 24 and securely holds positioning sleeve 14 in place. This is primarily accomplished by the slope 50 on alignment screw 24 compressing elastomeric stopper 32. The movement of alignment screw 24 pushes elastomeric stopper 32 against the inside of the wall of the connector tube 12, the outside surface of positioning sleeve 14 and the lens spacer 18 and firmly holds the connector tube 14 in place.

The elastomeric stoppers 34 and 36 contain a fiber optic channel 52 through which the prepared optical fiber also passes. The clamping screw 26 has not been tightened and therefore a small gap 54 appears between the clamping screw 26 and the elastomeric stopper 34. As clamping screw 26 is tightened, the gap 54 will disappear and the elastomeric stopper 34 will compress. This is shown on the opposite side as the elastomeric stopper 36 has been compressed by clamping screw 28 and securely holds the optical fiber in position in fiber optic channel 52. This is accomplished primarily by the slope 56 on the clamping screw 28 compressing elastomeric stopper 36. The movement of clamping screw 28 against elastomeric stopper 36 pushes elastomeric stopper 36 against the positioning sleeve 14, the inside of alignment screw 24 and the optical fiber and holds the optical fiber firmly in place. Pins 38 are an integral part of the lens spacer 18 and the function of pins 38 is to provide a reservoir for the coupling fluid between positioning sleeves 14 and 16.

The coupling reservoir 20 contains a viscose fluid in the preferred embodiment that has an index of refraction higher than the optical. fiber. The range for this viscose fluid ranges between 1.5 and 1.38. The viscose fluid must be placed into the reservoir after the present invention is assembled and therefore must be inserted through the optic channel 52. The viscosity of the fluid must be sufficiently thin to allow a filling needle (now shown) to be inserted through the optic channel. Since the optic channel 52 may vary from 5 to 15 microns in diameter, the hollow filling needle must be sufficiently small to allow entry into the optical channel 52. It is also desired to have a viscosity of the fluid sufficiently high that when the clamping screws 26 and 28 tighten the elastomeric stoppers 34 and 36 around the fiber optics, leakage will not occur. In the preferred embodiment, the viscose fluid is an oil specifically manufactured for fiber optic connectors. This type of oil may be purchased from Dow-Corning Inc.

Figure 2:
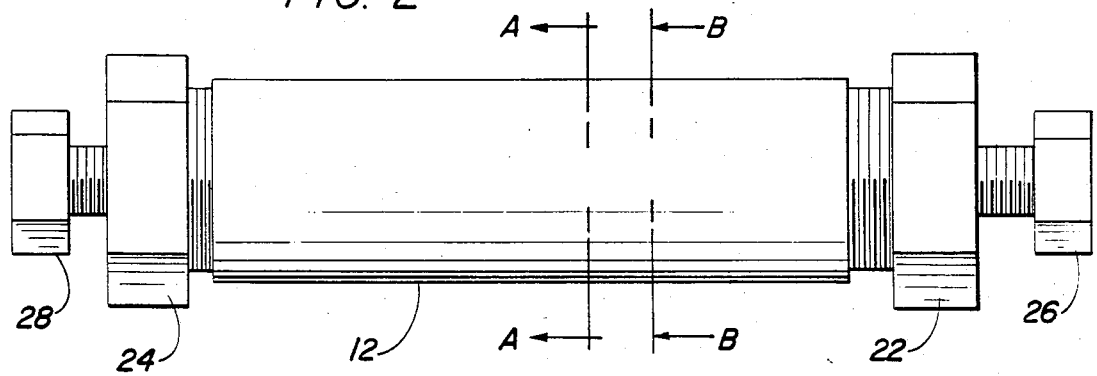
FIG. 2 is an outside profile of the connector.

FIG. 2 shows the outside profile of the connector. There can be seen the connector tube 12, the alignment screws 22 and 24 and the clamping screws 26 and 28.

Figure 3:
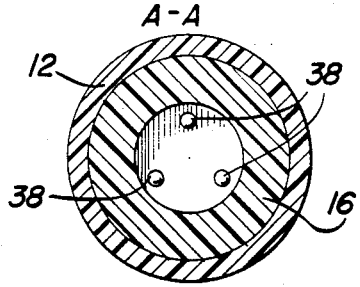
FIG. 3 is a section A—A of the connector showing the lens connector abutments.

FIG. 3 is a cross section A—A of FIG. 2 that shows the three (3) pins 38 that provide an abutment for positioning sleeve 16. Also shown is a cross section of the lens spacer 18 and the connector tube 12. The pins 38 on the opposite side of the lens connector 18 are made idential to the ones just described.

Figure 4:
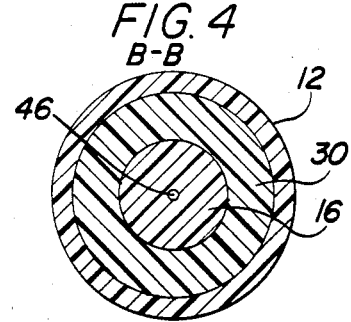
FIG. 4 is a section B—B showing the optical fiber channel.

FIG. 4 is a cross section B—B of FIG. 2 showing the optical channel 46, the positioning sleeve 16, the elastomeric stopper 30 and the connecting tube 12.

Figure 5:
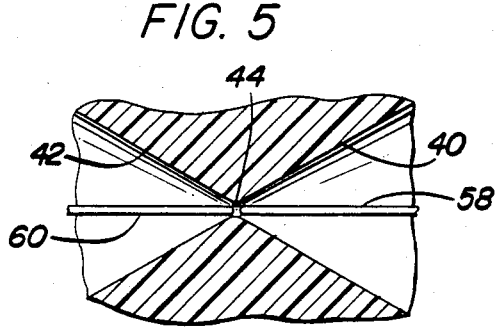
FIG. 5 is a magnified view of the optical channel with the optic fibers in place.

FIG. 5 is a magnified view of the area around and including the optical channel 44 that lies between funnels 40 and 42. The ends of optical fibers 58 and 60 are shown to illustrate the spacing of the optical fibers relative to optic channel 44.

Figure 6:
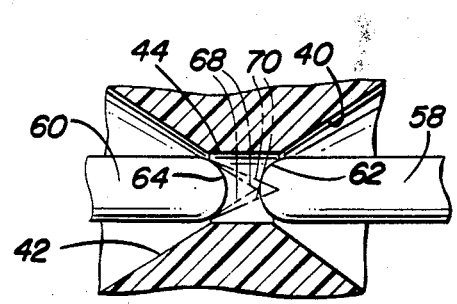
FIG. 6 is a greatly magnified view of the optic channel showing the optic fibers in place.

FIG. 6 is a further magnified view of the central area of FIG. 5 showing the optical channel 44, funnels 40 and 42 and optical fibers 58 and 60. Fibers 58 and 60 have been flame treated to provide hemispherical beads 62 and 64 on the ends of fibers 58 and 60 respectively which act as lenses on the ends of the optical fibers. In the preferred embodiment, the hemispherical beads 62 and 64 have a radius of curvature of 5 to 15 times the diameter of the optical fiber. In the transmission of light, the signal can only pass in one direction at any given instant. It is assumed that optical fiber 60 is the sender and optical fiber 58 is the receiver, the optical fibers 58 and 60 are moved in their respective channels until the distance between the hemispherical beads 62 and 64 are such that the light beams will pass through the lens 64 and focus either on the surfae of lens 62 or slightly internal to the surface of the lens 62. This is demonstrated by two (2) light rays 68 focusing on the surface of lens 62 and two (2) light rays 70 focusing slightly internal to the surface of lens 62. The coupling agent which surrounds lenses 62 and 64 enhances light transmission in the optical channel 44.

The parts as described in the present invention, except the elastomeric stoppers which are made from silicon rubber, are all manufactured from opaque plastic material to the desired size depending on the size of the optical fiber to be connected. One such material is VICTREX which is a plastic filled with glass fibers. This material is impervious to chemicals, can withstand temperatures to 120° centigrade and is hard, weatherproof, and easily machinable. However, in the preferred embodiment, VICTREX can also be molded to high tolerances which is more cost effective than machining. The lens spacer 18 is molded without the optic channel. The boring of the hole 44 will be described when the assembly is described.

In order to assembly the connector, the lens spacer 18 is placed in the center of the connector tube 12. The positioning sleeves 14 and 16 are placed in connector tube 12 on each side of the positioning sleeves 14 and 16. The elastomeric stoppers 30 and 32 are slid into positioning tube 12 and over positioning sleeves 16 and 14 respectively. The elastomeric stoppers 34 and 36 are slid into the alignment screws 22 and 24 respectively. The alignment screws 22 and 24 are then threaded into connector tube 12 and loosely tightened until the tapered surface of alignment screws 22 and 24 abut the surface of the elastomeric stoppers 30 and 32 respectively. The clamping screws 26 and 28 are threaded into alignment screws 22 and 28 and loosely tightened until the tapered end of clamping screws 26 and 28 abut the ends of elastomeric stoppers 34 and 36 respectively. The assembled connector 10 is placed in a vertical position and the filling needle is inserted in the lower optical channel. With the assembled connector 10 in the vertical position, the reservoir 20 is pressure filled by a viscose fluid until some of the viscose fluid appears at the top end of the connector 10. The placing of connector 10 in the vertical position will insure that all of the trapped air is displaced with viscose fluid. The alignment screws 22 and 24 are further tightened until the screws 22 and 24 bottom out on the positioning sleeves 16 and 14 respectively.

The assembled connector 10 is placed in a suitable jig (not shown) and a laser beam (not shown) is used to bore a hole in the center of the lens spacer 18. This results in optic channel 44 being formed which is bored slightly smaller than the optical fiber.

In order to further utilize the present invention, the broken end of the fiber optic must be properly prepared. The ends must be cleanly cut to obtain substantially at 90° cut to the fiber optic axis. There are several types of devices available for cutting optical fibers. One such device is described in U.S. Pat. No. 4,473,942 to Ridgeway. Next, the ends of the fiber optics must be flame treated until hemispherical beads such as 62 and 64 are formed on each cut end of the optical fibers. This can be done with the fibers in a vertical position with the cut end pointing downward while applying the flame.

When the fiber ends are properly treated, they are inserted in channels 52 and 46 on each end of the connector tube 10 and slid until the hemispherical beads or lenses 62 and 64 are in place on each side of the optical channel 44. In the preferred embodiment, the lens spacer 18 is designed such that the hemispherical beads 62 and 64 are separated a distance of $1\frac{1}{2}$ to $2\frac{1}{2}$ times the diameter of said optical fiber. The clamping screws 24 and 28 are thereby tightened sufficiently to secure the optical fibers in place.

In order to maximize the signal strength, a signal must be sent through the optical fiber and a measuring device (not shown) must be attached to the receiving end. The intrinsic losses may then be minimized by turning the aligning screws such that the signal strength as displayed on the measuring device is at a maximum. The alignment screws 22 and 24 and clamping screws 26 and 28 are each locked with a drop of epoxy cement on a suitable place on the threads.

It will be readily apparent to those skilled in the art that various modifications and changes can be made without departing from the spirit of the invention. While an operative example of this invention has been described with some particularity, it will be understood that modifications may be made therein, within the scope of the following claims.

What is claimed is:
1. A fiber optic connector system comprising:
    a pair of single optical fibers;
    a connector tube;
    a lens spacer internally placed substantially in the center of said connector tube;
    a pair of positioning sleeves having a bore abutting said lens spacer, said positioning sleeves having a center bore slightly larger than said optical fiber;
    a hole in said lens spacer that is optically aligned with the center bore of said positioning sleeves and said clamping screws;
    means for securing and sealing said positioning sleeves in said connector tube;
    means for aligning said optical fibers;
    means for clamping said optical fibers:
    a cutter for cutting said optical fibers whrein the cut end is substantially perpendicular to the axis of said optical fiber;
    means for melting each cut end of said optical fibers whrein said melted ends will form sustantially hemispherical beads;
    means for securing said optical fibers with said hemispherical beads in each end of said connector tube wherein said hemispherical beads are seperated by said lens spacer a distance of $1\frac{1}{2}$ and $2\frac{1}{2}$ times the diameter of said optical fibers;
    coupling means between said hemispherical beads inside connector tube wherein said coupling means is a viscous fluid whose index of refraction is between 1.38 and 1.58;
    adjusting means for maximizing light transmission through said optical fibers and,
    locking means for securing said adjusting means to said connector tube.
2. A fiber optic connector system as described in claim 1 wherein said means for securing and sealing said positioning sleeves in said connector tube is an elastomeric stopper fitted over said positioning sleeve.
3. A fiber optic connector system as described in claim 1 wherein said means for aligning said optical fibers is a pair of alignment screws having a center bore, said alignment screws being internally threadably secured to the outer end of said connector tube.
4. A fiber optic connector system as described in claim 1 wherein said means for clamping said optical fibers is a pair of clamping screws having a center bore, said clamping screws being internally threadably secured to the outer end of said bore of said alignment screws.
5. A fiber optic connector system as described in claim 1 wherein said hole in the center of said lens spacer is optically aligned with the center bore of said positioning sleeves by drilling with a suitable laser beam.
6. A fiber optic connector system as described in claim 1 wherein said means for melting each said cut end of said optical fibers and thereby forming said hemispherical beads is a oxy-hydrogen flame.
7. A fiber optic connector system as described in claim 1 wherein said hemispherical bead has a radius of curvature of 5 to 15 times the diameter of the optical fiber.
8. A fiber optic connector system as described in claim 1 wherein said means for securing said optical fibers with said hemispherical beads is an elastomeric stopper with a center bore slightly larger than said optical fiber with said fiber optic stopper being placed in the bore of each alignment screw.
9. A fiber optic connector system as described in claim 1 wherein a light source passing through one hemispherical bead will be substantially focused on the face of the other hemispherical bead.
10. A fiber optic connector system as described in claim 1 wherein said adjusting means for maximizing light transmission through said optical fibers is turning said alignment screws.
11. A fiber optic connector as described in claim 1 wherein said locking means is placing a liquid that will harden on the threads of said alignment screws and said clamping screws at the point where said threads enter said respective bores.
12. A method of manufacturing a fiber optic connector system which comprises:
    (a) providing a pair of single optical fibers;
    (b) providing a non-metallic material;

(c) fabricating a connector tube from said non-metallic material;

(d) fabricating a lens spacer from said non-metallic material, said lens spacer internally placed substantially in the center of said connector tube;

(e) fabricating a pair of positioning sleeves from said non-metallic material, said positioning sleeves having a bore abutting said lens spacer, said positioning sleeves having a center bore slightly larger than said optical fibers:

(f) fabricating a pair of alignment screws from said non-metallic material, said pair of alignment screws used for aligning said optical fibers, said alignment screws having a center bore and internally threadably secured to the outer end of said connector tube;

(g) fabricating a pair of clamping screws from said non-metallic material, said clamping screws used for clamping said optical fibers, said clamping screws having a center bore and internally threadably secured to the outer end of said bore of said alignment screws;

(h) drilling a hole in said lens spacer that is optically aligned with the center bore of said positioning sleeve and said clamping screws;

(i) securing and sealing said positioning sleeves by positioning an elastomeric stopper over said positioning sleeve;

(j) providing elastomeric stoppers with a center bore slightly larger than said optical fiber, said elastomeric stopper being placed in the bore of each alignment screw to secure and hold said optical fiber;

(k) providing a cutter for cutting said optical fiber wherein said cut is substantially perpendicular to the axis of said fiber;

(l) melting each end of said cut of said optical fibers by a oxy-hydrogen flame, wherein said melted ends will form substantially hemispherical beads, and said hemispherical beads are separated by said lens spacer a distance of $1\frac{1}{2}$ to $2\frac{1}{2}$ times the diameter of said optical fibers;

(m) injecting coupling means into a reservoir provided by said lens spacer, wherein said coupling means is a viscous fluid whose index of refraction is between 1.38 and 1.58;

(n) inserting said optical fibers containing hemispherical beads on each end into said bore of said clamping screws, through the bore of said elastomeric stoppers, through said positioning sleeve into correct position with respect to said optical channel;

(o) tightening said clamping screw to hold the optical fiber firmly in said connector tube;

(p) adjusting said alignment screws to maximize light transmission through said optical fibers;

(q) locking the threads on said alignment screws and said clamping screws with a suitable cement.

13. The method of claim 12 wherein said holes in said lens spacer is optically aligned with the center bore of said positioning sleeves by drilling with a suitable laser beam.

14. The method of claim 12 wherein said hemispherical bead has a radius of curvature of 5 to 15 times the diameter of the optical fiber.

* * * * *